April 27, 1943.   J. SKULKETY   2,317,818
CONTROL STICK FOR AIRCRAFT
Filed Dec. 4, 1941
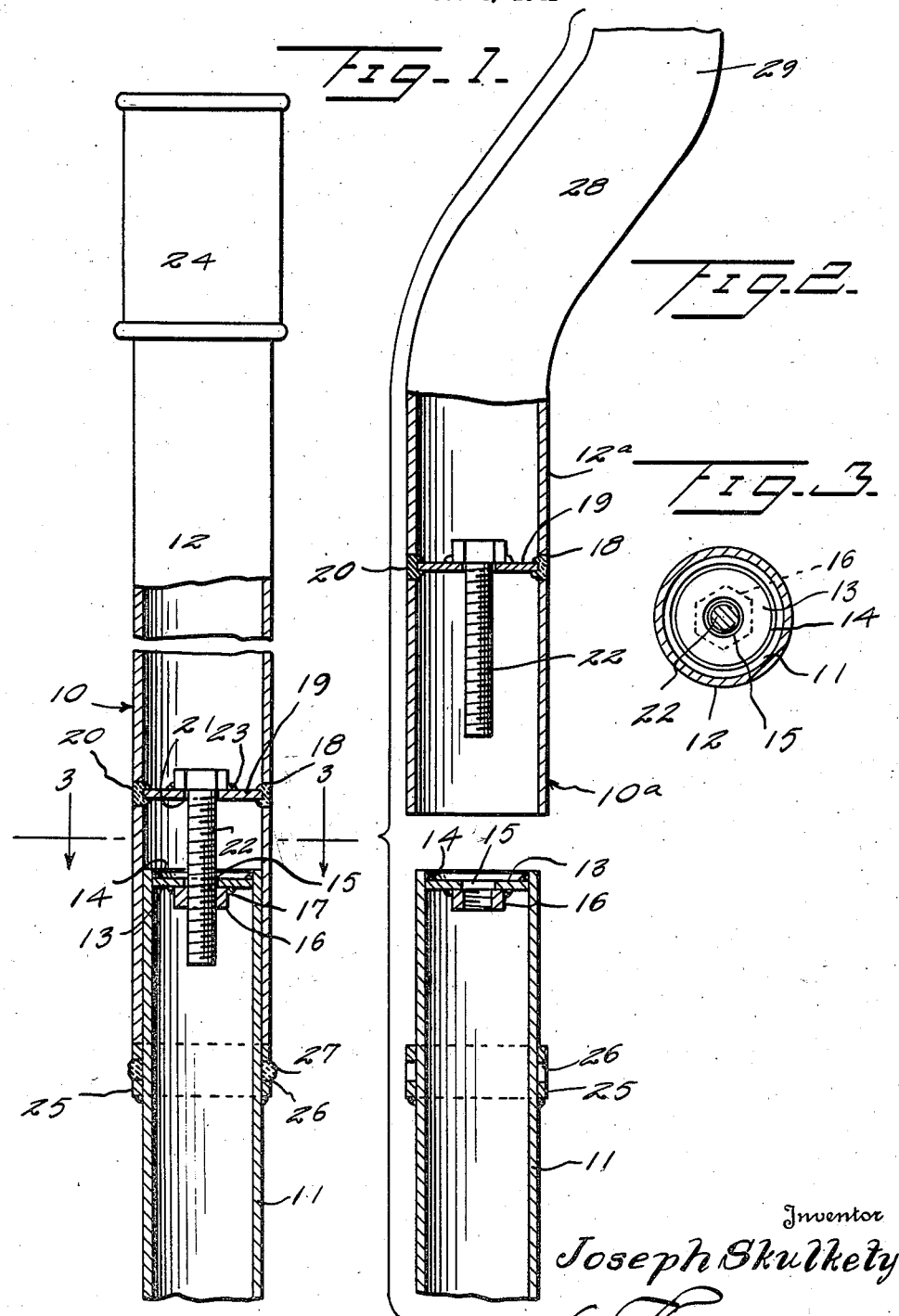
Inventor
Joseph Skulkety
By L. F. Randall
Attorney Patented Apr. 27, 1943

2,317,818

UNITED STATES PATENT OFFICE 2,317,818

CONTROL STICK FOR AIRCRAFT

Joseph Skulkety, Trenton, N. J.

Application December 4, 1941, Serial No. 421,664

2 Claims. (Cl. 244—83)

This invention relates to a novel control stick for aircraft and more particularly to a control stick formed of telescoping sections which are slidably and rotatably connected, and which are provided with means for detachably connecting the sections, so that the upper, handle carrying section can be removed if desired.

Still another aim of the invention is to provide a control stick of the above described character in which the upper section is provided with an offset remote or upper portion, forming the handle thereof, having means arranged so that when the stick sections are assembled said offset portion will be disposed to project, from the longitudinal axis of the stick, in a direction toward the pilot.

Other objects and advantages of the invention will hereinafter become more fully apparent from the following description of the drawing, which illustrate preferred embodiments of the invention, and wherein:

Figure 1 is a side elevational view, partly in section, of a portion of the stick, constructed in accordance with the invention, showing the stick sections connected, Figure 2 is a similar view of a modified form of the invention showing the stick sections disconnected, and Figure 3 is a cross sectional view of the control stick taken substantially along a plane as indicated by the line 3—3 of Figure 1.

Referring more particularly to the drawing, wherein like reference characters designate like or corresponding parts throughout the different views, 10 designates generally a portion of a control stick, as shown in Figure 1, including the parts thereof constituting the invention. The control stick 10 is formed of tubular sections 11 and 12. The upper or inner end only of the lower section 11 is illustrated and it is to be understood that the opposite end thereof, not shown, is intended to be connected in a conventional manner to the mechanism of an aircraft which is operated by a control stick. A disk 13 is secured in the upper or inner end of the section 11 by means of welding, as seen at 14, and the disk 13 is provided with a central opening 15. A nut 16 is secured to the under side of the disk 13 by welding 17. The threaded bore of the nut 16 is disposed in alinement with the opening 15 and is smaller in diameter than said opening. The upper section 12 is larger in diameter than the section 11 and its lower end is adapted to slidably and turnably engage the upper end of section 11.

The upper section 12, near its lower end, is provided with circumferentially spaced openings 18. A disk 19 is disposed in the section 12 and is fixedly secured thereto by being welded, as seen at 20, through the openings 18. The disk 19 is provided with a central opening 21 through which extends the threaded shank of a bolt 22, the head of which bolt is disposed on the inner or upper side of the disk 19 and secured thereto by welding, as at 23. The opposite, upper end of the section 12 is provided with a handle 24. A collar 25 is disposed around the section 11, near its upper end, and is provided with openings 26 for receiving welds 27 by means of which it is fixedly secured to the section 11.

The shank of the bolt 22 is sized to engage the threaded opening of the nut 16 and to loosely extend through the opening 15 so that after the adjacent ends of the sections 11 and 12 are connected they can be slid inwardly relatively to each other until the shank end of the bolt 22 engages the nut 16, after which by turning the section 12 in one direction the bolt 22 will be screwed into the nut 17 to advance the section 12 onto the section 11, until its lower end engages the collar 25. To detach the stick sections, section 12 is turned in the opposite direction until the bolt 22 disengages the nut 16, after which it is to be drawn upwardly and detached from the section 11.

In Figure 2, a slightly modified form of the invention is illustrated, wherein the control stick 10a is formed of sections 11 and 12a. The section 11 of the stick 10a corresponds with the section 11 of the stick 10. The section 12a differs from the section 12 only in that it is provided with an intermediate oblique portion 28 for offsetting its upper end 29, which is provided with a handle, not shown, from the longitudinal axis of the stick 10a. In order to connect the sections 11 and 12a so that the offset upper end 29 will project in the correct direction from the longitudinal axis of the stick 10a, that is, in a direction toward the pilot, the sections 11 and 12 are connected by the nut 16 and bolt 22 before the collar 25 is secured to the section 11. After the sections are connected, the section 12 is positioned so that its end 29 is correctly disposed, and the collar 25 is then positioned against the lower end of the section 12a and secured by welding to the section 11 in the same manner as previously described and as shown in Figure 1. Consequently, the sections 11 and 12a can be connected and disconnected and when assembled end 29 will always be correctly disposed.

Various modifications and changes are contemplated and may obviously be resorted to, provided they fall within the spirit and scope of the invention as hereinafter defined by the appended claims, as only preferred embodiments thereof have been disclosed.

I claim as my invention:

1. A control stick for aircraft formed of telescoping inner and outer tubular sections, a disk secured in the upper end of the inner tubular section and provided with a threaded opening, a threaded bolt fixedly disposed within and concentric of the outer section and having its threaded shank and engaging the threaded opening for detachably connecting the stick sections, said sections being turnably and slidably connected for connecting and disconnecting the bolt and disc, a collar secured around the inner section to be engaged by the end of the outer section which engages over the inner section, for limiting the movement of the sections toward one another, the opposite end of the outer section being offset relatively to the longitudinal axis of the stick, and said collar being located so that, when the first-mentioned end of the outer section is in engagement therewith, the offset end will project in a certain predetermined direction from the longitudinal axis of the stock.

2. A control stick for aircraft formed of telescoping inner and outer tubular sections, a disc secured in the upper end of the inner tubular section and provided with a threaded opening, a threaded bolt fixedly disposed within and concentric of the outer section and having its threaded shank end engaging the threaded opening for detachably connecting the stick sections, said sections being turnably and slidably connected for connecting and disconnecting the bolt and disc, said outer section having circumferentially-spaced openings, a disc disposed in the outer section and secured thereto by welds, disposed in said openings, said last-mentioned disc having an opening through which the bolt extends, and the head of the bolt being welded to the last-mentioned disc.

JOSEPH SKULKETY.